: 3,267,168
PURIFICATION OF DIENE MONOMERS
Ervin G. Pritchett, Cincinnati, Ohio, and Noel L. Hofmann, University Park, Pa., assignors to National Distillers and Chemical Corporation, New York, N.Y., a corporation of Virginia
No Drawing. Filed Aug. 28, 1963, Ser. No. 305,229
16 Claims. (Cl. 260—681.5)

This invention relates to conjugated diolefin monomers and more particularly to a process for purifying such monomers.

When conjugated diolefin monomers, for example butadiene and isoprene, are to be polymerized with alkali metal or organometal catalysts, the purity of the monomers must be high in order to prevent deactivation of the catalysts by reaction with proton-donating impurities such as water; acetylenes; oxygen; oxygen-, sulfur-, or nitrogen-containing organic compounds; cyclopentadiene; and the like. When the diolefin is to be polymerized to a functionalized polymer, for example when a terminal glycol is prepared from lithium-polymerized polybutadiene that is terminated with ethylene oxide, and especially if the terminated products are to be chain-extended through the functional groups into high molecular weight, curable polymers, monomer purity is especially important to prevent loss of lithium chain ends via reaction with proton-donating impurities. Diolefin purity also is extremely critical in producing the commercially important high-cis polyisoprenes, e.g., as in H. E. Diem et al., Rubber Chem. and Tech. 34, 191,192 (1961).

It is known that conjugated diolefin monomers can be purified by contacting them with finely-divided sodium; in this process, however, there is excessive monomer loss because of polymerization of the diolefin over sodium; further, it is possible that the reaction will be violent and uncontrollable. The use of alkyl sodium compounds for purifying diolefins, e.g., those disclosed in German Patent No. 1,121,604, has been unsatisfactory because of the need to employ with them costly, highly self-igniting, or poisonous compounds to act as polymerization inhibitors, e.g., Group III organic compounds.

It is an object of this invention to provide an effective process for the purification of conjugated diolefin monomers.

It is a further object of the invention to provide a purification process for conjugated diolefin monomers that overcomes the disadvantages of the processes of the prior art.

Further objects will become apparent from the following description.

It has now been found that impure or partially pure diene monomers can be purified to a high degree by treating them at a temperature between about 0° and 80° C. with an aryl sodium compound that is substantially free of sodium metal. The present process overcomes the disadvantages of the prior art processes in that the conjugated diolefin monomers can be purified with only minor or no polymerization loss, using as purifier a single organometallic compound, i.e., without the use of an additional and separate polymerization inhibitor.

The exact process whereby the conjugated diolefin monomer is purified with the aryl sodium is not unduly critical. In one embodiment the conjugated diolefin monomer may be dissolved in an inert liquid solvent or diluent containing a suspension of aryl sodium substantially free of sodium metal. After a suitable contact time, the purified monomer is distilled from the mixture or is removed as a solution in the diluent by filtration from the aryl sodium and the sodium decomposition products.

In another embodiment, the conjugated diolefin monomer to be purified may be fed continuously into a suspension in an inert diluent of aryl sodium substantially free of sodium metal, and the purified diolefin is distilled from the mixture concurrently.

Alternatively, the aryl sodium compound substantially free of sodium metal and free of any solvent may be packed, with or without an inert filler, such as sodium chloride, glass fiber, or stainless steel wire, into a suitable column through which the conjugated diolefin monomer is passed, either alone or as a solution in an inert solvent or diluent.

The temperature at which the purification takes place can be between about 0° and 80° C. and is preferably in the range of about 20° to 50° C. Temperatures below about 0° C. are inefficient; temperatures above about 80° C. encourage thermal dimerization or polymerization of the monomer.

Contact times can vary from a few seconds up to several hours; when phenyl sodium is used, the preferred contact time is about 30 seconds to about 1 hour.

An inert atmosphere, such as nitrogen, argon, helium, or other inert gas, is desirable to reduce aryl sodium loss through reaction with oxygen or moisture.

The process of the present invention is applicable to any conjugated diolefin monomer, such as for example butadiene, isoprene, 2-methylbutadiene, 2,3-dimethylbutadiene, 2-phenylbutadiene, hexadiene-1,3, and the like. Although a commercial grade of the monomer can be used, preferably the monomers are prepurified, for example by contacting them with regeneratable Molecular Sieves, to reduce requirements for length of contact time and amount of aryl sodium in the purification process of this invention.

The aryl compound can be any organosodium compound, preferably having fewer than about 18 carbon atoms, in which the sodium is attached directly to an aromatic ring, provided that no group is present that is reactive to sodium or to organosodium. Typical of such compounds are phenyl sodium, m-t-butyl phenyl sodium, naphthyl sodium, biphenyl sodium, and the like, with phenyl sodium being preferred. The aryl sodium compound substantially free of sodium metal does not react with or polymerize the conjugated diolefin monomer; it is, however, highly reactive to compounds that destroy such polymerization catalysts as organolithium compounds. The aryl sodium compound must be substantially free of sodium metal because sodium, particularly in finely-divided form, will initiate monomer polymerization prematurely.

The aryl sodium of this invention may be prepared in any known and convenient manner.

Advantageously, the conjugated diolefin can be contacted with an aryl sodium that has been prepared in situ. Preparation of the aryl sodium in situ from sodium metal and a haloaromatic compound, to be suitable for the practice of this invention, requires use of a method that provides stoichiometric reaction of the sodium metal with the haloaromatic compound so as to eliminate the presence of free sodium metal. It has been found that sodium metal in the form of a highly active dispersion reacts substantially quantitatively with haloaromatic compounds such as chlorobenzene at equivalence or with a slight deficiency of sodium metal to produce aryl sodium compounds that are essentially unreactive in situ to conjugated diolefins subsequently added, even in the presence of moderate amounts of such contaminants as diethyl ether and triethyl amine. The term "highly active" sodium dispersions refers to sodium dispersions that exhibit an activity toward titanium tetrachloride of at least about 85 percent. Such dispersions may be prepared, for example, in accordance with the process described in U.S. 3,012,974.

The solvent or diluent may be any hydrocarbon that is liquid at temperatures employed in the instant process and is inert to sodium and aryl sodium compounds, such as, for example, pentane, heptane, cyclohexane, benzene, t-butyl benzene, kerosene, and the like, and mixtures thereof.

The amount of aryl sodium required for satisfactory purification of the diene depends upon the amount of active impurities present. When the diolefin has been prepurified, about 0.01 up to about 10 weight percent of aryl sodium, based on the weight of the diolefin monomer, is required; preferably about 0.1 to about 5 weight percent of the aryl sodium is used.

The concentration of the inert solvent or diluent, if used, is not critical.

The following examples are given for illustrative purposes only and are not intended to place any restrictions or limitations on the herein described invention. Unless otherwise specified, all parts are given by weight.

The activity characteristics of sodium dispersions were determined by the following procedure and the particle sizes determined by visual examination with a microscope.

A 2 to 3 gram sample of the sodium dispersion is weighed into a small, dry, round-bottomed flask, taking care to exclude atmospheric oxygen during the operation. The flask is attached to a system containing a pressure-equalized dropping funnel and a gas burette. The dispersion is diluted with 30 ml. of mineral spirits, then treated with 1.5 ml. of titanium tetrachloride in 10 ml. of mineral spirits. The titanium tetrachloride is added over a five-minute period from the dropping funnel. The mixture is stirred magnetically for several minutes; it is then treated with 20 ml. of ethylene glycol monomethyl ether; and the volume of hydrogen evolved is measured. The hydrogen evolved is a measure of the sodium that did not react with titanium tetrachloride.

The procedure is then repeated except that the treatment with titanium tetrachloride is omitted; the hydrogen generated in this case is a measure of the total sodium in the sample.

The activity, expressed as a percent, is calculated as follows:

$$\text{Percent activity} = \left(1 - \frac{P_2 V_2 M_1 T_1}{P_1 V_1 M_2 T_2}\right) \times 100$$

where $P$ = atmospheric pressure,
$V$ = volume of hydrogen,
$M$ = weight of sample,
$T$ = absolute temperature,
Subscript 1 refers to the untreated specimen,
Subscript 2 refers to the titanium tetrachloride treated specimen.

Example I

To 170 parts of dry heptane, well-stirred under nitrogen in a Morton flask, was added 0.978 part (0.0425 atom) of sodium in the form of a fine dispersion (having an average particle size of less than about 5 microns) in kerosene and having an activity of 91.5 percent of titanium tetrachloride. Dry chlorobenzene (2.38 parts, 0.0212 mole) was then added slowly to the well-stirred suspension over about 30 minutes at ambient temperature. The suspension became black as soon as the chlorobenzene was added, and the black product was aged for 30 minutes after the addition was complete.

Butadiene-1,3 (previously prepurified by passing it through a Lind Number 5A Molecular Sieve packed in a 3 x 36 inch column) (9.73 parts, 0.18 mole) was added to the suspension; escape of the gas was prevented by a reflux condenser held at −80° C. The mixture was stirred for two hours at 25° to 50° C. without evidence of any polymerization; gaseous carbon dioxide was then stirred into the mixture.

The mixture was washed with 50 ml. of 1.5 N hydrochloric acid and then with water to pH 5–6. Upon evaporation of the washed heptane layer, 2.4 parts (94 percent based on sodium) of benzoic acid and a trace (less than one percent based on butadiene) of polymer were obtained.

These results show that (1) phenyl sodium was formed in substantially quantitative yield, (2) the phenyl sodium was essentially unreactive to butadiene-1,3 in hydrocarbon solvent, and (3) about 0.007 mole of phenyl sodium per mole of butadiene was consumed by impurities.

Example II

Into a 4 x 24 cm. glass tube reactor, equipped with a magnetic stirrer and filled with argon, were placed 22 parts of dry heptane and 0.23 part (0.01 atom) of highly active (89 percent to titanium tetrachloride) sodium as a dispersion in kerosene. With external cooling, 0.56 part (0.005 mole) of dry chlorobenzene in 8 parts of heptane was added over 30 minutes at 25° C.; the mixture was aged for 30 minutes at ambient temperature. The tube and its contents were then cooled to −15° C., and 35 parts of Molecular Sieve prepurified butadiene-1,3 was distilled in. Stirring was continued for 15 minutes; the tube was then warmed at 20° C. to distill out butadiene and finally at 50° C. to reduce solubility in the solvent. Highly purified butadiene-1,3 (33 parts, 94.3 percent) was recovered. Lithiopolybutadiene, prepared by polymerizing this highly purified butadiene with butyl lithium, evidenced a significant increase in the retention of lithium end groups compared to that prepared with butadiene purified over Molecular Sieve only.

Decomposition of the residue from the purification with methanol and evaporation of the solvent after washing with water left 0.2 gram of gum, representing 0.67 percent of the butadiene entered.

In order to demonstrate that the present invention requires the use of an aryl sodium compound, a comparative run was made using an alkyl sodium compound, as described in Example III.

Example III

To 170 parts of dry heptane, well-stirred under nitrogen in a Morton flask, was added 1.96 parts (0.085 atom) of sodium from the same dispersion as used in Example I. 3.9 parts (0.042 mole) of dry n-butyl chloride was added over 30 minutes at ambient temperature, and the mixture was allowed to age for 15 minutes. 31.7 parts (0.586 mole) of dried butadiene-1,3, prepurified by passing it through a Molecular Sieve, was then added to the well-stirred heptane-butyl sodium mixture at 0° to 25° C. An exothermic reaction took place at about 20° C. and higher. The reaction was terminated by the addition of 2 parts (0.0455 mole) of ethylene oxide and then 20 parts of solid, powdered carbon dioxide. The mixture was acidified with concentrated hydrochloric acid to pH 1, the organic layer was washed with water to pH 6 (some difficulty with emulsions being encountered), solvent was removed in vacuo, and 20.7 parts of a liquid oil was obtained as residue. The oil had a hydroxyl number of 34.9 and an acid number of 1.1, corresponding to a terminally functional polymer of 1,550 molecular weight. The infrared spectrum of the oil showed the unsaturation expected for polybutadiene in a ratio of 68.8% vinyl/ 15.9% trans/15.3% cis.

Consequently, it is concluded that an alkyl sodium does not purify a conjugated diolefin, but instead polymerizes a major portion of it.

Example IV 4-sodiobiphenyl, prepared by reacting 4-chlorobiphenyl with a stoichiometric amount of highly active sodium dispersion in n-pentane, was deposited in a 24 in. x ½ in. diameter column containing an inert filler of ⅟₁₆ in. Pyrex beads. Pentane was removed from the column through a glass-wool pool at the bottom by pressuring with argon.

100 parts of commercial polymerization grade isoprene was passed upward through the column at 35° C. in a slow stream of argon and was thereafter condensed at −10° C. In polymerization with butyl lithium, the isoprene thus obtained evidenced a substantially shortened induction period compared to that not contacted with aryl sodium.

While there are above disclosed but a limited number of embodiments of the invention herein presented, it is possible to produce still other embodiments without departing from the inventive concept herein disclosed; it is desired, therefore, that only such limitations be imposed on the appended claims as are stated therein.

What is claimed is:

1. A process for the purification of a conjugated diolefin monomer which consists essentially of contacting said diolefin monomer with an aryl sodium compound substantially free of sodium metal.
2. The process of claim 1 wherein the aryl sodium compound is phenyl sodium.
3. The process of claim 1 wherein the purification temperature is between about 0° and 80° C.
4. The process of claim 1 wherein the monomer is butadiene.
5. The process of claim 1 wherein the monomer is isoprene.
6. The process of claim 1 wherein the monomer is prepurified.
7. The process of claim 1 wherein the monomer is prepurified and the amount of the aryl sodium compound ranges from about 0.01 up to about 10 weight percent, based on the monomer.
8. The process of claim 1 wherein the aryl sodium compound has been prepared in situ by a stoichiometric reaction of a highly active sodium dispersion with a haloaromatic compound.
9. A process for the purification of a conjugated diolefin monomer which consists essentially of prepurifying said monomer; treating the prepurified monomer with about 0.01 up to about 10 weight percent, based on the monomer, of an aryl sodium compound substantially free of sodium metal at a temperature between about 0° and 80° C.; and recovering the purified conjugated diolefin monomer.
10. A process for the purification of butadiene which consists essentially of treating it with phenyl sodium at a temperature between about 0° and 80° C.
11. The process of claim 10 wherein the butadiene is prepurified.
12. The process of claim 10 wherein the butadiene is prepurified and the amount of phenyl sodium is about 0.01 up to about 10 weight percent, based on the butadiene.
13. A process for the purification of butadiene which consists essentially of prepurifying said butadiene; treating the prepurified butadiene with about 0.1 up to about 5 weight percent, based on the butadiene, of phenyl sodium at a temperature between about 20° and 50° C.; and recovering the purified butadiene.
14. A process for the purification of isoprene which consists essentially of treating it with phenyl sodium at a temperature between about 0° and 80° C.
15. The process of claim 14 wherein the isoprene is prepurified and the amount of phenyl sodium is about 0.01 up to about 10 weight percent, based on the isoprene.
16. A process for the purification of isoprene which consists essentially of prepurifying said isoprene; treating the prepurified isoprene with about 0.1 up to about 5 weight percent, based on the isoprene, of biphenylsodium at a temperature between about 20° and 50° C.; and recovering the purified isoprene.

References Cited by the Examiner

FOREIGN PATENTS 1,121,604  1/1962  Germany.

DELBERT E. GANTZ, *Primary Examiner.*

S. P. JONES, *Assistant Examiner.*